(12) United States Patent
Weinmann et al.

(10) Patent No.: US 10,411,320 B2
(45) Date of Patent: Sep. 10, 2019

(54) COMMUNICATION DEVICES AND SYSTEMS WITH COUPLING DEVICE AND WAVEGUIDE

(71) Applicant: 3M INNOVATIVE PROPERTIES COMPANY, St. Paul, MN (US)

(72) Inventors: Christian Weinmann, Alsdorf (DE); Jaewon Kim, Woodbury, MN (US); Justin M. Johnson, Hudson, WI (US); Dipankar Ghosh, Oakdale, MN (US); Craig W. Lindsay, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 19 days.

(21) Appl. No.: 15/565,536

(22) PCT Filed: Apr. 11, 2016

(86) PCT No.: PCT/US2016/026866
§ 371 (c)(1),
(2) Date: Oct. 10, 2017

(87) PCT Pub. No.: WO2016/171930
PCT Pub. Date: Oct. 27, 2016

(65) Prior Publication Data
US 2018/0123253 A1    May 3, 2018

Related U.S. Application Data

(60) Provisional application No. 62/150,379, filed on Apr. 21, 2015, provisional application No. 62/150,383, filed on Apr. 21, 2015.

(51) Int. Cl.
*H01P 1/208* (2006.01)
*H01P 3/16* (2006.01)
(Continued)

(52) U.S. Cl.
CPC .............. *H01P 1/2084* (2013.01); *H01P 3/16* (2013.01); *H01P 7/10* (2013.01); *H04B 7/155* (2013.01);
(Continued)

(58) Field of Classification Search
CPC .......... H01P 1/2084; H01P 1/208; H01P 3/16; H01P 7/10
See application file for complete search history.

(56) References Cited

U.S. PATENT DOCUMENTS

| 4,560,965 A | 12/1985 | Gosling et al. |
| 5,943,005 A | 8/1999 | Tanizaki |

(Continued)

FOREIGN PATENT DOCUMENTS

| CN | 102480035 | 5/2012 |
| WO | WO 01/024407 A1 * | 4/2001 |

(Continued)

OTHER PUBLICATIONS

Alam, "Dielectric Resonator Antennas (DRA) for satellite and body area network applications", Other Universite Paris-Est, 2012, 196pgs.
(Continued)

*Primary Examiner* — Robert Karacsony
(74) *Attorney, Agent, or Firm* — X. Christina Huang

(57) ABSTRACT

At least some aspects of the present disclosure feature a communication device for propagating an electromagnetic wave around a blocking structure. The communication device includes a passive coupling device to capture the electromagnetic wave, and a waveguide electromagnetically coupled to the coupling device. The waveguide is disposed around the blocking structure. The waveguide has a resonance frequency matched with the coupling device. The waveguide is configured to propagate the electromagnetic wave captured by the coupling device.

12 Claims, 10 Drawing Sheets

(51) Int. Cl.
  *H01P 7/10* (2006.01)
  *H04B 7/155* (2006.01)
  *H01Q 3/46* (2006.01)
  *H01Q 15/00* (2006.01)
  *H01Q 19/30* (2006.01)

(52) U.S. Cl.
  CPC ............ *H01Q 3/46* (2013.01); *H01Q 15/0086* (2013.01); *H01Q 19/30* (2013.01)

(56) References Cited

U.S. PATENT DOCUMENTS

| | | | |
|---|---|---|---|
| 5,999,308 | A | 12/1999 | Nelson |
| 6,297,715 | B1 | 10/2001 | Fiedziuszko |
| 6,590,477 | B1 | 7/2003 | Elco |
| 6,954,124 | B2 | 10/2005 | Enokihara et al. |
| 7,177,513 | B2 | 2/2007 | Povinelli |
| 7,218,190 | B2 | 5/2007 | Engheta |
| 7,470,581 | B2 | 12/2008 | Kommera |
| 7,592,957 | B2 | 9/2009 | Achour |
| 7,750,869 | B2 | 7/2010 | Mosallaei |
| 8,149,181 | B2 | 4/2012 | Yen et al. |
| 8,435,427 | B2 | 5/2013 | Ghosh |
| 8,723,722 | B2 | 5/2014 | Fuller |
| 2002/0027481 | A1 | 3/2002 | Fiedziuszko |
| 2005/0031295 | A1 | 2/2005 | Engheta |
| 2005/0057405 | A1 | 3/2005 | Horibe |
| 2007/0205946 | A1* | 9/2007 | Buris ............... H01Q 1/007 343/700 MS |
| 2008/0238796 | A1 | 10/2008 | Rofougaran |
| 2009/0040131 | A1 | 2/2009 | Mosallaei |
| 2012/0228563 | A1 | 9/2012 | Fuller |
| 2012/0274147 | A1 | 11/2012 | Stecher |
| 2013/0260842 | A1 | 10/2013 | Wisnewski |
| 2013/0324041 | A1 | 12/2013 | Pagani |
| 2014/0159959 | A1 | 6/2014 | Rhoads |
| 2015/0295300 | A1* | 10/2015 | Herbsommer ......... H01P 3/122 333/208 |

FOREIGN PATENT DOCUMENTS

| | | |
|---|---|---|
| WO | WO 2003-087904 | 10/2003 |
| WO | WO 2008-014303 | 1/2008 |
| WO | WO 2012-148450 | 11/2012 |
| WO | WO 2013-016928 | 2/2013 |
| WO | WO 2016-172020 | 10/2016 |

OTHER PUBLICATIONS

Bouwstra, "Smart Jacket Design for Neonatal Monitoring with Wearable Sensors", Proceedings of the 2009 Sixth International Workshop on Wearable and Implantable Body Sensor Networks, 2009, pp. 162-167.

Chandran, "Pattern Switching Compact Patch Antenna for On-body and Off-body Communications at 2.45GHz", 3$^{rd}$ European Conference on Antennas and Propagation (EuCAP), 2009, pp. 2055-2057.

Degirmenci, "Finite Element Method Analysis of Band Gap and Transmission of Two-Dimensional Metallic Photonic Crystals at Terahertz Frequencies", Applied Optics, Oct. 2013, vol. 52, No. 30, pp. 7367-7375, XP001585002.

Fukuda, "A 12.5+12.5 Gb/s Full Duplex Plastic Waveguide Interconnect", IEEE Journal of Solid-State Circuits, Dec. 2011, vol. 46, No. 12, pp. 3113-3125, XP011379217.

Ghosh, "Tunable High-Quality-Factor Interdigitated (Ba, Sr) TiO$_3$ Capacitors Fabricated on Low-Cost Substrates with Copper Metallization", Thin Solid Films, 2006, vol. 496, pp. 669-673.

Ghosh, "Tunable Microwave Devices Using BST( Barium Strontium Titanate)and Base Metal Electrodes", Ph.D Thesis, North Carolina State University, 2005.

Nath, "An Electronically-Tunable Microstrip Bandpass Filter Using Thin-Film Barium Strontium-Titanate (BST) Varactors", IEEE Transactions on Microwave Theory and Techniques, Sep. 2005, vol. 53, No. 9, pp. 2707-2712.

Sanchez-Escuderos, "EBG Structures for Antenna Design at THz Frequencies", Antennas and Propagation (APSURSI), 2011 IEEE International Symposium on, IEEE, Jul. 2011, pp. 1824-1827, XP032191559.

Takano, "Fabrication and Performance of TiO$_2$-Ceramic-Based Metamaterials for Terahertz Frequency Range", IEEE Transactions on Terahertz Science and Technology, Nov. 2013, vol. 3, No. 6, pp. 812-819, XP055204802.

Ueda, "Demonstration of Negative Refraction in a Cutoff Parallel-Plate Waveguide Loaded with 2-D Square Lattice of Dielectric Resonators", IEEE Transactions on Microwave Theory and Techniques, Jun. 2007, vol. 55, No. 6, pp. 1280-1287, XP011185162.

Ullah, "A Comprehensive Survey of Wireless Body Area Networks", Journal of Medical Systems, 2012, vol. 36, No. 3, pp. 1065-1094.

International Search Report for PCT International Application No. PCT/US2016/026866, dated Jul. 20, 2016, 6pgs.

International Search Report for PCT International Application No. PCT/US2016/028038, dated Jul. 20, 2016, 5 pages.

* cited by examiner

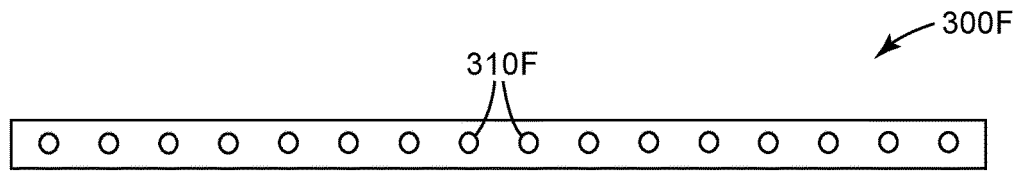
Fig. 3F
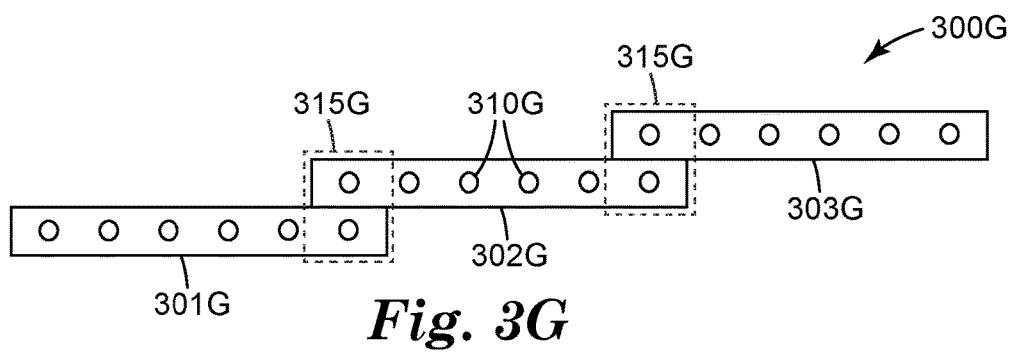
Fig. 3G
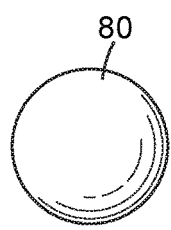 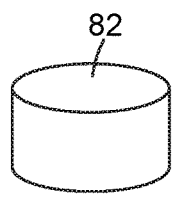 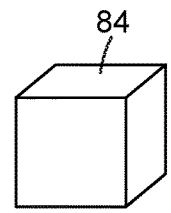 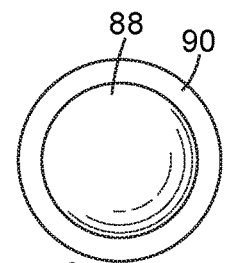
Fig. 4A    Fig. 4B    Fig. 4C    Fig. 4D

COMMUNICATION DEVICES AND SYSTEMS WITH COUPLING DEVICE AND WAVEGUIDE

CROSS REFERENCE TO RELATED APPLICATIONS

This is a national stage filing under 35 U.S.C. 371 of PCT/US2016/026866, filed Apr. 11, 2016, which claims priority to U.S. Provisional Application No. 62/150,383 filed Apr. 21, 2015, and U.S. Provisional Application No. 62/150,379 filed Apr. 21, 2015, the disclosure of which are incorporated by reference in their entireties herein.

TECHNICAL FIELD

The present disclosure relates to waveguides using high dielectric resonator(s) and coupling devices.

SUMMARY

At least some aspects of the present disclosure feature a communication device for propagating an electromagnetic wave around a blocking structure, comprising: a passive coupling device disposed proximate to a first side of the blocking structure and configured to capture the electromagnetic wave, a transmitter disposed proximate to a second side of the blocking structure, and a waveguide electromagnetically coupled to the coupling device and the transmitter and disposed around the blocking structure. The waveguide has a resonance frequency matched with the coupling device. The waveguide is configured to propagate the electromagnetic wave captured by the coupling device. The transmitter is configured to reradiate the electromagnetic wave.

BRIEF DESCRIPTION OF DRAWINGS

The accompanying drawings are incorporated in and constitute a part of this specification and, together with the description, explain the advantages and principles of the invention. In the drawings.

FIGS. 3A-3G illustrate some example arrangements of HDRs;

FIGS. 4A-4C are block diagrams illustrating various shapes that can be used for the structure of an HDR;

FIG. 4D is a block diagram illustrating an example of a spherical HDR coated with a base material;

Figure 1:
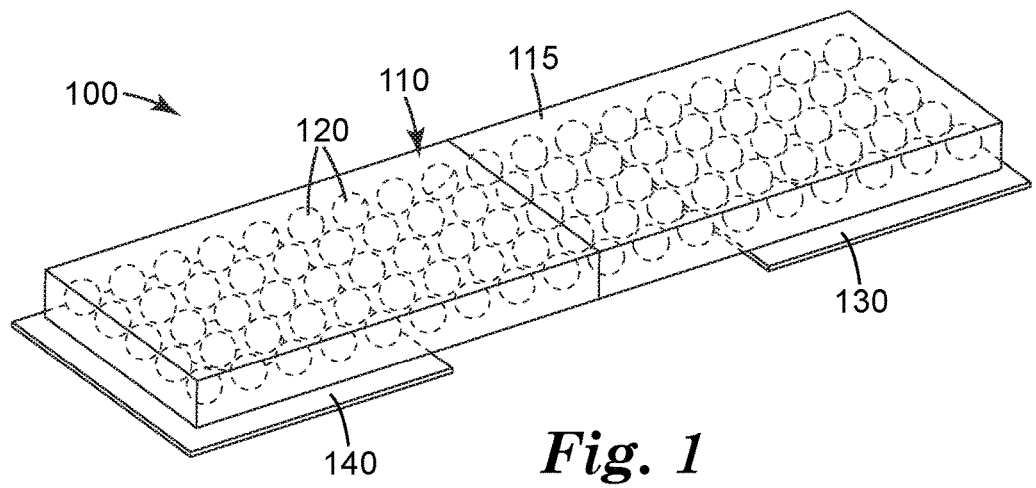
FIG. 1 is a block diagram illustrating an example system or device that includes a waveguide with high dielectric resonators.

In the drawings, like reference numerals indicate like elements. While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

At least some aspects of the present disclosure direct to a waveguide having a base material having a low relative permittivity and a plurality of high dielectric resonators (HDRs), where HDRs are spaced in such a way as to allow energy transfer between HDRs. HDRs are objects that are crafted to resonate at a particular frequency, and may be constructed of a ceramic-type material, for example. When an electromagnetic (EM) wave having a frequency at or near to that of the resonance frequency of an HDR passes through the HDR, the energy of the wave is efficiently transferred. When the energy transfer between HDRs is taken in combination with the efficient and low-loss transfer of the EM wave energy due to the resonance of the HDRs, the EM wave can be a power ratio of more than three times the power ratio of a wave that is initially received. In some cases, HDRs are disposed in the base material. In some cases, HDRs are coated with the base material. In some embodiments, the waveguide is electromagnetically coupled to a first transceiver and a second transceiver, such that signals can be transmitted from the first transceiver to the second transceiver through the waveguide or vice versa and then transmitted wirelessly from the first and/or second transceiver. In some cases, the waveguide can be disposed on or integrated with a garment such that the garment can facilitate and/or propagate signal collection on a human body. In some case, the first and/or the second transceivers are electrically coupled to one or more sensors and configured to transmit or receive the sensor signals.

At least some aspects of the present disclosure direct to a communication device or system to be used on a blocking structure that does not allow the propagation of electromagnetic waves within a wavelength band. In some cases, the communication system can include a first coupling device disposed proximate to one side of the blocking structure, a waveguide disposed on or integrated with the blocking structure, and a second coupling device disposed proximate another side (e.g., the opposite side) of the blocking structure. The waveguide is electromagnetically coupled to the first coupling device and the second coupling device. A coupling device refers to a device that can effectively capture EM waves and reradiate EM waves. For example, a coupling device can be a dielectric lens, a patch antenna array, a Yagi antenna, a metamaterial coupling element, or the like. In some embodiments, the first coupling device can capture an incoming EM wave, propagate the EM wave via the waveguide to the second coupling device, and the second coupling device can reradiate a corresponding EM wave.

FIG. 1 is a block diagram illustrating an example system or device that includes a waveguide with high dielectric resonators, in accordance with one or more techniques of this disclosure. In this system 100, waveguide 110 is electromagnetically coupled to transceivers (130, 140). Waveguide includes a base material 115 and a plurality of HDRs 120 that are distributed throughout waveguide 110 in a pattern. Waveguide 110 receives a signal from one of the two transceivers, which propagates through HDRs 120 and into an opposing end of waveguide 110. The signal could be, for example an electromagnetic wave, an acoustic wave, or the like. In some examples, the signal is a 60 GHz millimeter wave signal. The signal exits waveguide 110 through one of the two transceivers. In the example illustrated, a waveguide is coupled with two transceivers; however, a waveguide can be coupled with three or more transceivers. In some cases, one or more of the transceivers is only a transmitter. In some cases, one or more of the transceivers is only a receiver.

Waveguide 110 is a structure that guides waves. Waveguide 110 generally confines the signal to travel in one dimension. Waves typically propagate in multitude of directions, for example, spherical waves, when in open space. When this happens, waves lose their power proportionally to the square of the distance traveled. Under ideal conditions, when a waveguide receives and confines a wave to traveling in only a single direction, the wave loses little to no power while propagating.

In some embodiments, the base material 115 can include materials, for example, such as Teflon®, quartz glass, cordierite, borosilicate glass, perfluoroalkoxy, polyurethane, polyethylene, fluorinated ethylene propylene, or the like. In some cases, the base material can include, for example, copper, brass, silver, aluminum, or other metal having a low bulk resistivity. In one example, waveguide 110 has a size of 2.5 mm×1.25 mm, and is made of Teflon®, having a relative permittivity, $\varepsilon_r$,=2.1 and a loss tangent=0.0002, with 1 mm thick Aluminum cladding on the interior walls of waveguide 110.

Waveguide 110 is a structure made of a low relative permittivity material, such as Teflon®, for example. In other examples, the substrate portion of waveguide 110 may be made of materials such as quartz glass, cordierite, borosilicate glass, perfluoroalkoxy, polyethylene, or fluorinated ethylene propylene, for example. In some examples, waveguide 110 has a trapezoidal shape, with a tapered end positioned proximate to one end of waveguide 110. In one example, waveguide 110 is formed of a Teflon® substrate 46 cm in length and 25.5 mm thick, with HDR spheres having a relative permittivity of 40, a radius of 8.5 mm, lattice constant of 25.5 mm, with spacing between transceiver 130 and waveguide 110 being 5 mm.

In some embodiments, waveguide 110 contains a plurality of HDRs 120 arranged within the base material 115 such that the lattice distance between adjacent HDRs is less than the wavelength of the electromagnetic wave that is designed to propagate. In some embodiments, waveguide 110 contains a plurality of HDRs 120 arranged within the base material 115 in an array. In some examples, this array is a two dimensional grid array. In some cases, this array is a regular array. A regular array can be, for example, a periodic array such that adjacent HDRs have a generally same distance along a dimension.

In some examples, the resonance frequency of the HDRs is selected to match the frequency of the electromagnetic wave. In some examples, the resonance frequency of the plurality of resonators is within a millimeter wave band. In one example, the resonance frequency of the plurality of resonators is 60 GHz. Each of these HDRs may then refract the wave towards the respective HDR having the same vertical placement in the singular vertical line of three equally spaced HDRs. Standing waves are formed in waveguide 110 that oscillate with large amplitudes.

HDRs 120 can also be arranged in other arrays with specific spacing. For example, the HDRs 120 are arranged in a line with a predetermined spacing. In some cases, the HDRs may be arranged in three-dimensional arrays. For example, the HDRs may be arranged in a cylindrical shape, a stacked matrix, a pipe shape, or the like. The HDRs 120 may be spaced in such a way that the resonance of one HDR transfers energy to any surrounding HDR. This spacing is related to Mie resonance of the HDRs 120 and system efficiency. The spacing may be chosen to improve the system efficiency by considering the wavelength of any electromagnetic wave in the system. Each HDR 120 has a diameter and a lattice constant. In some examples, the lattice constant and the resonance frequency are selected based at least in part on the waveguide and the relative permittivity of HDRs. The lattice constant is a distance from the center of one HDR to the center of a neighboring HDR. In some examples, HDRs 120 may have a lattice constant of 1 mm. In some examples, the lattice constant is less than the wavelength of the electromagnetic wave.

The ratio of the diameter of the HDR and the lattice constant of the HDRs (diameter D/lattice constant a) can be used to characterize the geometric arrangement of HDRs 120 in waveguide 110. This ratio may vary with the relative permittivity contrast of the base material and HDRs. In some examples, the ratio of the diameter of the resonators to the lattice constant is less than one. In one example, D may be 0.7 mm and a may be 1 mm, with a ratio of 0.7. The higher that this ratio is, the lower the coupling efficiency of the waveguide becomes. In one example, the maximum limit of the lattice constant for the geometric arrangement of HDRs 120 as shown in FIG. 1 will be the wavelength of the emitted wave. The lattice constant should be less than the wavelength, but for a strong efficiency, the lattice constant should be much smaller than the wavelength. The relative size of these parameters may vary with the relative permittivity contrast of the base material and the HDRs. The lattice constant may be selected to achieve the desired performance within the wavelength of the emitted wave. In one example, the lattice constant may be 1 mm and the wavelength may be 5 mm, i.e., a lattice constant that is one fifth of the wavelength. Generally, the wavelength (λ) is the wavelength in air medium. If another dielectric material is used for the medium, the wavelength for this formula should be replaced by $\lambda_{\mathit{eff}}$, which is:

$$\lambda_{\mathit{eff}} = \frac{\lambda}{\sqrt{\varepsilon_r}}$$

where $\varepsilon_r$ is the relative permittivity of the medium material.

A high relative permittivity contrast between HDRs 120 and the base material 115 of waveguide 110 causes excitement in the well-defined resonance modes of the HDRs 120. In other words, the material of which HDRs 120 are formed has a high relative permittivity compared to the relative permittivity of the base material of waveguide 110. A higher contrast will provide higher performance and so, the relative permittivity of HDRs 120 is an important parameter in determining the resonant properties of HDRs 120. A low contrast may result in a weak resonance for HDRs 120 because energy will leak into the base material of waveguide 110. A high contrast provides an approximation of a perfect boundary condition, meaning little to no energy is leaked into the base material of waveguide 110. This approximation can be assumed for an example where the material forming HDRs 120 has a relative permittivity more than 5-10 times of a relative permittivity of the base material 115 of the waveguide 110. In some cases, each of HDRs 120 has a relative permittivity that is at least five times of a relative permittivity of the base material 115. In some examples, each of the plurality of resonators has a relative permittivity that is from at least two times greater than a relative permittivity of the base material 115. In other examples, each of the plurality of resonators has a relative permittivity that is at least ten times greater than a relative permittivity of the base material 115. For a given resonant frequency, the higher the relative permittivity, the smaller the dielectric resonator, and the energy is more concentrated within the dielectric resonator. In some embodiments, each of the plurality of resonators has a relative permittivity greater than 20. In some cases, each of the plurality of resonators has a relative permittivity greater than 50. In some cases, each of the plurality of resonators has a relative permittivity greater than 100. In some cases, each of the plurality of resonators has a relative permittivity within the range of 200 to 20,000.

In some embodiments, HDRs may be treated to increase relative permittivity. For example, at least one of HDRs are heat treated. As another example, at least one of HDRs are sintered. In such example, the at least one of HDRs may be sintered at a temperature higher than 600° C. for a period of two to four hours. In other cases, the at least one of HDRs may be sintered at a temperature higher than 900° C. for a period of two to four hours. In some embodiments, the base material includes Teflon®, quartz glass, cordierite, borosilicate glass, perfluoroalkoxy, polyurethane, polyethylene, fluorinated ethylene propylene, a combination thereof, or the like. In some cases, the base material has a relative permittivity in the range of 1 to 20. In some cases, the base material has a relative permittivity in the range of 1 to 10. In some cases, the base material has a relative permittivity in the range of 1 to 7. In some cases, the base material has a relative permittivity in the range of 1 to 5.

In some examples, the plurality of resonators are made of a ceramic material. HDRs 120 can be made of any of a variety of ceramic materials, for example, including BaZnTa oxide, BaZnCoNb oxide, Zirconium-based ceramics, Titanium-based ceramics, Barium Titanate-based materials, Titanium oxide-based materials, Y5V, and X7R compositions, for example, among other things. HDRs 120 can be made of at least one of one doped or undoped Barium Titanate ($BaTiO_3$), Barium Strontium Titanate ($BaSrTiO_3$), Y5V, and X7R compositions, $TiO_2$ (Titanium dioxide), Calcium Copper Titanate ($CaCu_3Ti_4O_{12}$), Lead Zirconium Titanate ($PbZr_xTi_{1-x}O_3$), Lead Titanate ($PbTiO_3$), Lead Magnesium Titanate ($PbMgTiO_3$), Lead Magnesium Niobate-Lead Titanate ($Pb(Mg_{1/3}Nb_{2/3})O_3$—$PbTiO_3$), Iron Titanium Tantalate ($FeTiTaO_6$), NiO co-doped with Li and Ti($La_{1.5}Sr_{0.5}NiO_4$, $Nd_{1.5}Sr_{0.5}NiO_4$), and combinations thereof. In one example, HDRs 120 may have a relative permittivity of 40. In some embodiments, the waveguide is flexible. For example, the waveguide has a base material of silicone composite and HDRs made of $BaTiO_3$.

Although illustrated in FIG. 1 for purposes of example as being spherical, in other examples HDRs 120 may be formed in various different shapes. In other examples, each of HDRs 120 may have a cylindrical shape. In still other examples, each of HDRs 120 may have a cubic or other parallelepiped shape. In some example, each of HDRs can have a rectangular shape, or an elliptical shape. HDRs 120 could take other geometric shapes. The functionality of the HDRs 120 may vary depending on the shape, as described in further detail below with respect to FIGS. 4A-4C.

Transceivers 130 and/or 140 can be a device that emits a signal of electromagnetic waves. Transceivers 130 and/or 140 could also be a device that receives waves from waveguide 110. The waves could be any electromagnetic waves in the radio-frequency spectrum, for example, including 60 GHz millimeter waves. In some embodiments, the resonance frequency of the plurality of resonators is within a millimeter wave range. In some cases, the resonance frequency of the plurality of resonators is approximate to 60 GHz. In some cases, the resonance frequency of the plurality of resonators is within infrared frequency range. So long as the HDR diameter and lattice constant follow the constraints stated above, waveguide 110 of system 100 can be used for any wave in a band of radio-frequency spectra, for example. In some examples, waveguide 110 may be useful in the millimeter wave band of the electromagnetic spectrum. In some examples, waveguide 110 may be used with signals at frequencies ranging from 10 GHz to 120 GHz, for example. In other examples, waveguide 110 may be used with signals at frequencies ranging from 10 GHz to 300 GHz, for example.

Waveguide 110 having HDRs 120 could be used in a variety of systems, including, for example, body area network, body sensor network, 60 GHz communication, underground communication, or the like. In some examples, a waveguide such as waveguide 110 of FIG. 1 may be formed to include a substrate and a plurality of high dielectric resonators, wherein an arrangement of the HDRs within the substrate is controlled during formation such that the HDRs are spaced apart from one another at selected distances. The distances between HDRs, i.e., the lattice constant, may be selected based on a wavelength of an electromagnetic wave signal with which the waveguide is to be used. For example, lattice constant may be much smaller than the wavelength. In some examples, during formation of waveguide 110, the substrate material of waveguide 110 may be divided into multiple portions. Where there is a determination of a location of a plane of HDRs, the substrate material may be segmented. Hemi-spherical grooves may be included in multiple portions of substrate material at the location of each HDR. In other examples with differently shaped HDRs, hemi-cylindrical or hemi-rectangular grooves may be included in the substrate material. HDRs may then be placed in the grooves of the substrate material. The multiple portions of substrate material may then be combined to form a singular waveguide structure with HDRs embedded throughout. While FIG. 1 illustrates a communication device/system having two transceivers coupled to a waveguide, persons with ordinary skilled of art can easily design communication devices/systems with multiple transceivers coupled to one or more waveguides.

Figure 2A:
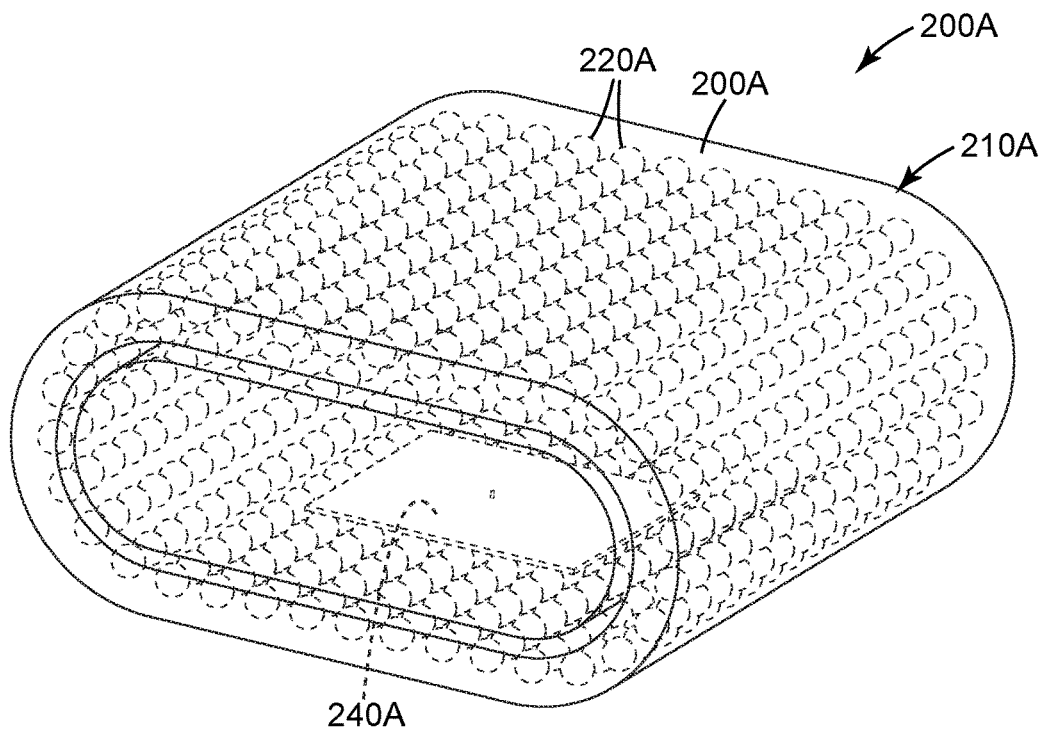
FIG. 2A illustrates a conceptual diagram of one example of a communication system using a waveguide with HDRs.
Figure 2B:
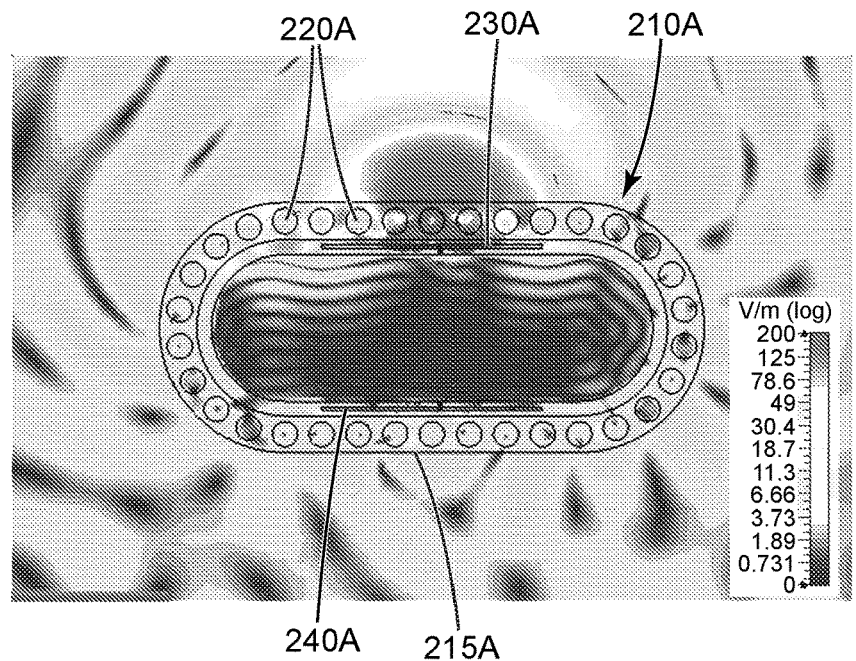
FIG. 2B is an EM amplitude plot of the communication system illustrated in FIG. 2A.
Figure 2C:
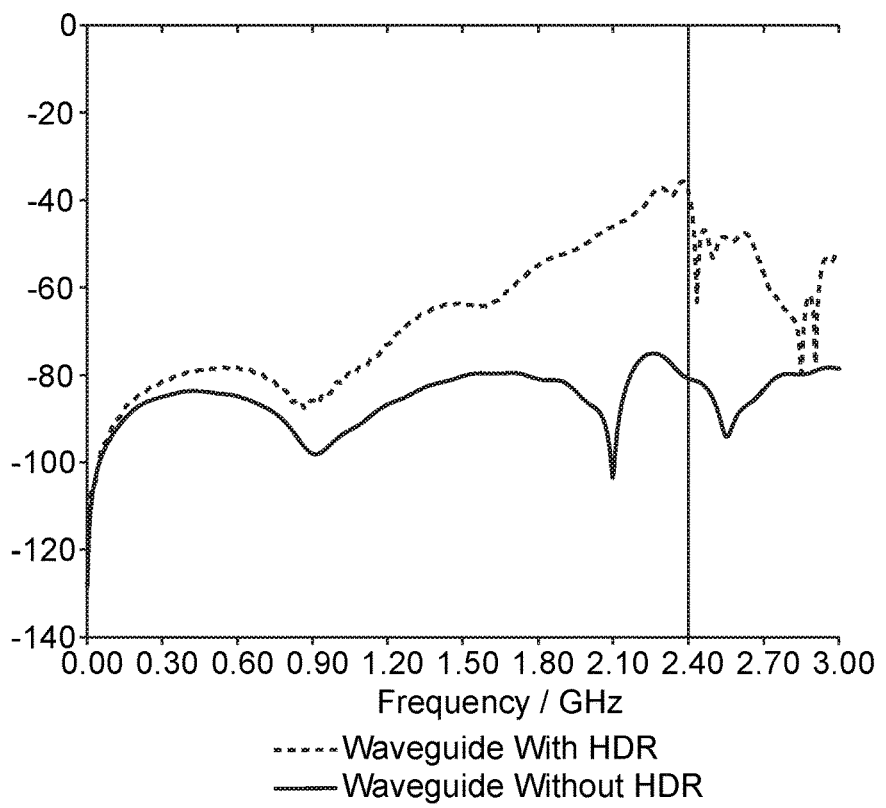
FIG. 2C shows a comparison plot of the communication system illustrated in FIG. 2A with and without HDRs.

FIG. 2A illustrates a conceptual diagram of one example of a communication system 200A using a waveguide with HDRs; FIG. 2B is an EM amplitude plot of the communication system 200A; FIG. 2C shows a comparison plot of the communication system 200A with and without HDRs. The communication system 200A includes a closed loop waveguide 210A coupled to two transceivers 230A and 240A, where the transceiver 230A can be better seen in FIG. 2B. The waveguide 210A includes a base material 215A and a plurality of HDRs 220A. The transceiver 230A receives a 2.4 GHz EM wave signal and propagate the signal via the waveguide 210A. As the plot in FIG. 2B shows, the EM field strength is strong at the transceiver 230A and remains greater than 5.11 V/m along the HDRs 220A. As illustrated in FIG. 2C, at 2.4 GHz, the S-parameter for a waveguide having HDRs as illustrated in FIG. 2A is −38.16 dB and the S-parameter for a waveguide without HDRs is −80.85 dB, where the S-parameter describes the signal relationship between the two transceivers.

Figure 2D:
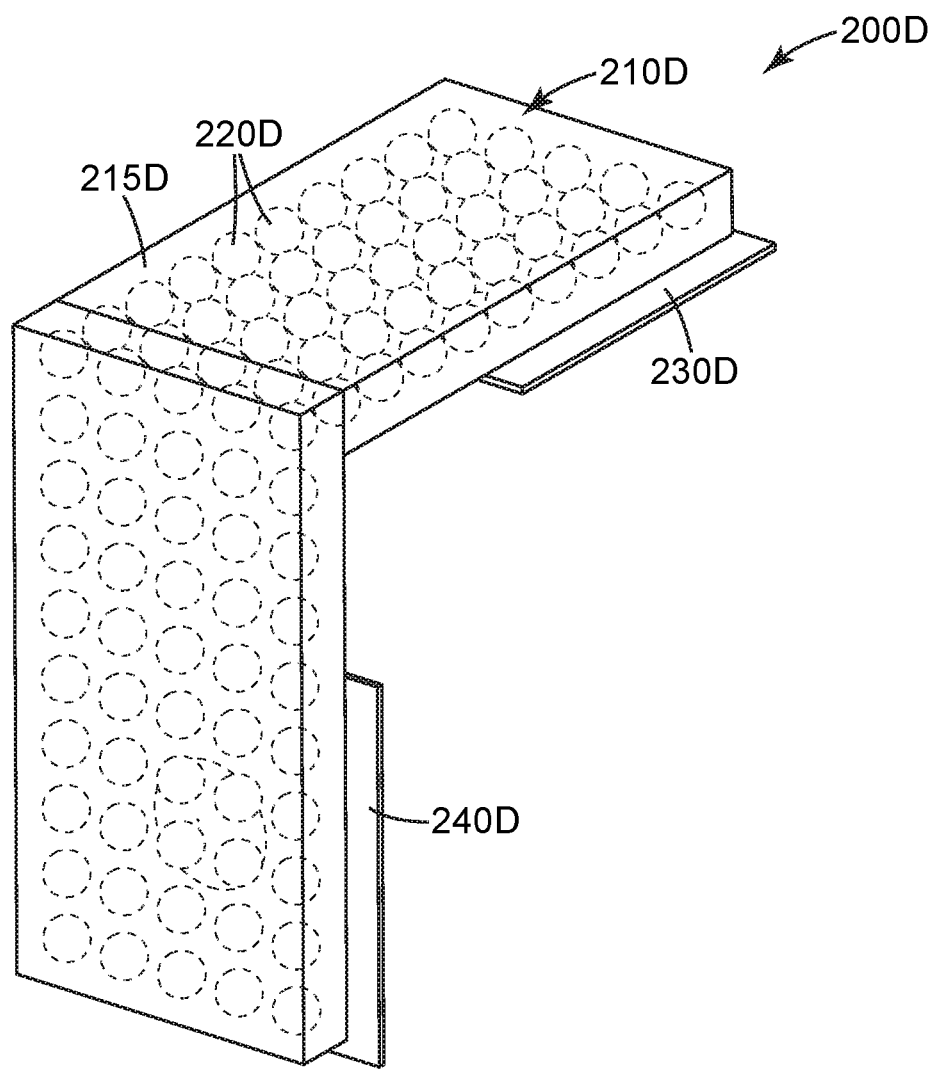
FIG. 2D illustrates a conceptual diagram of one example of a communication system using a waveguide with HDRs.
Figure 2E:
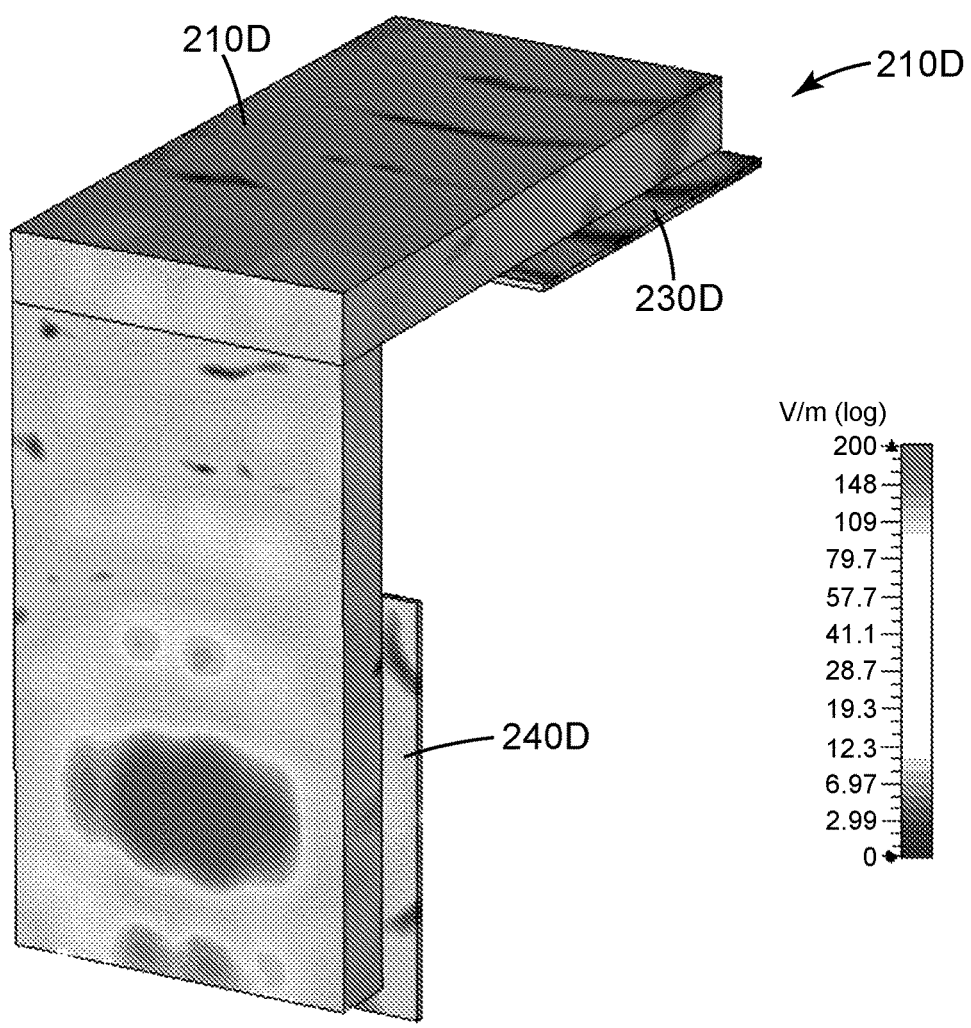
FIG. 2E is an EM amplitude plot of the communication system illustrated in FIG. 2D.
Figure 2F:
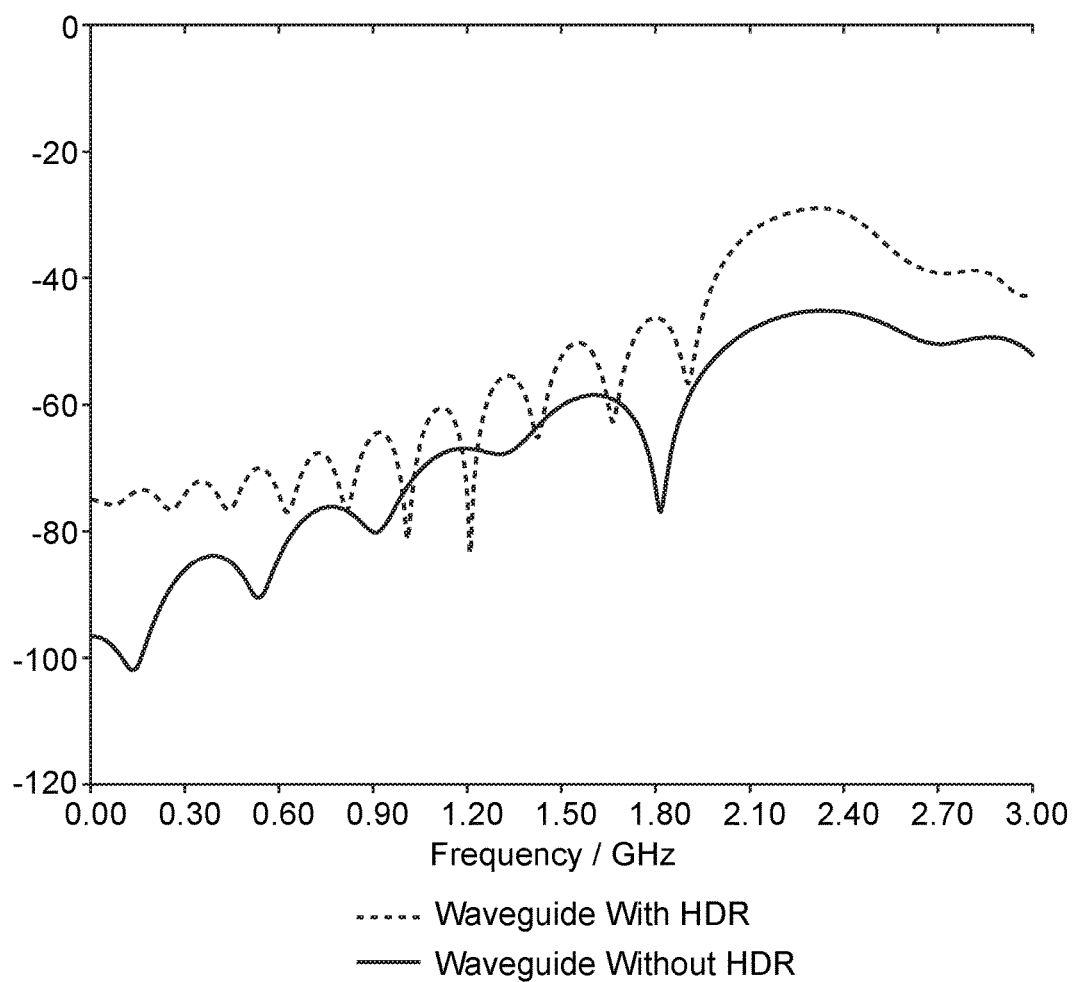
FIG. 2F shows a comparison plot of the communication system illustrated in FIG. 2D with and without HDRs.

FIG. 2D illustrates a conceptual diagram of one example of a communication system 200D using a waveguide with HDRs; FIG. 2E is an EM amplitude plot of the communication system 200D; FIG. 2F shows a comparison plot of the communication system 200D with and without HDRs. The communication system 200D includes an "L" shape waveguide 210D coupled to two transceivers 230D and 240D. The waveguide 210D includes a base material 215D and a plurality of HDRs 220D. The transceiver 240D receives a 2.4 GHz EM wave signal and propagate the signal via the waveguide 210D. As the plot in FIG. 2D shows, the EM field strength is strong at the transceiver 240D and remains greater than 5.11 V/m along the HDRs 220A. As illustrated in FIG. 2F, at 2.4 GHz, the S-parameter for a waveguide having HDRs illustrated in FIG. 2C is −29.68 dB and the S-parameter for a waveguide without HDRs is −45.38 dB.

Figure 3A:
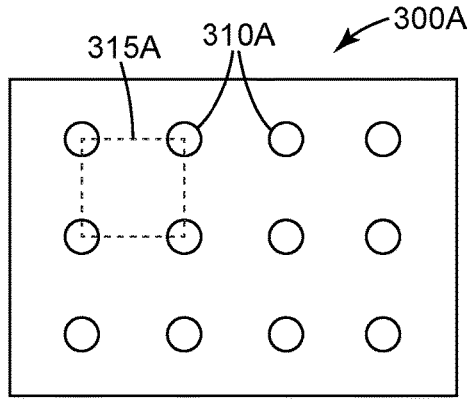
Figure 3B:
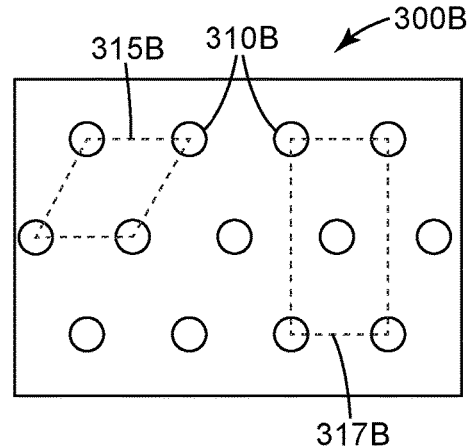

FIGS. 3A-3G illustrate some example arrangements of HDRs. The figures use a circle to represent an HDR; however, each HDR can use any configuration of HDR described herein. FIG. 3A illustrates one example of a waveguide 300A having a plurality of HDRs 310A disposed in an array, where the array has generally same alignments between each rows. In some cases, the four adjacent HDRs in two adjacent rows form a rectangular shape 315A. In some cases, 315A is generally a square, that is, the distance between two adjacent rows is the same distance as the distance between two adjacent HDRs in a row. In some embodiments, the adjacent HDRs in a row have a generally same spacing. In some embodiments, for a row of desired spacing between adjacent HDRs of S, the distance between any two adjacent HDRs in a row is within the range of S*(1±40%). FIG. 3B illustrates another example of a waveguide 300B having a plurality of HDRs 310B disposed in an array, where the array has different alignments between two adjacent rows. In some cases, the four adjacent HDRs in two adjacent rows form a parallelogram 315B. In some cases, four HDRs in every other two rows form a rectangular shape 317B. In some cases, every two adjacent rows have generally same distance.

Figure 3C:
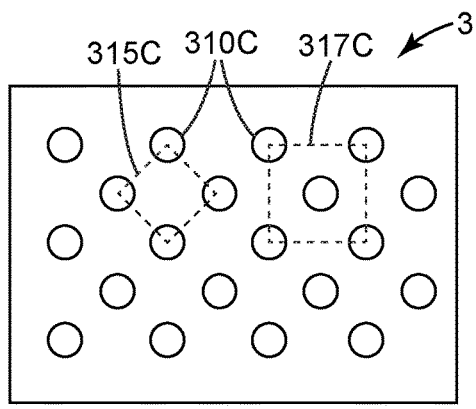

FIG. 3C illustrates one example of a waveguide 300C having a plurality of HDRs 310C disposed in an array, where the array has different alignments between two adjacent rows. In some cases, the four adjacent HDRs in three adjacent rows form a square 315C. In some other cases, the distance between two adjacent HDRs in a row is generally the same as the distance between two adjacent HDRs between two rows. In some cases, four HDRs in every other two rows form a rectangular shape 317C. In some cases, the rectangular shape 317C is a square.

Figure 3D:
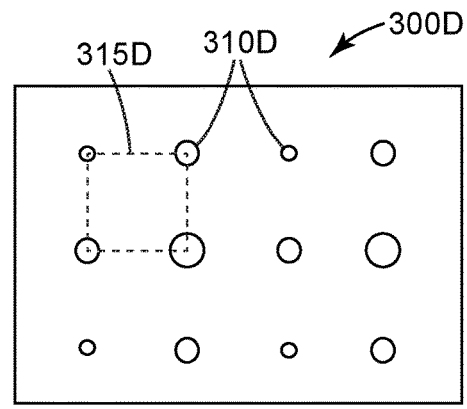
Figure 3E:
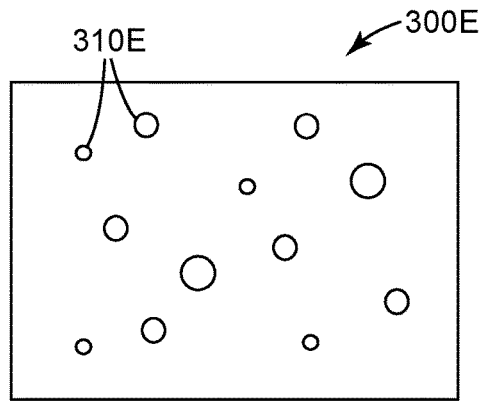

FIG. 3D illustrates one example of a waveguide 300D having a plurality of HDRs 310D disposed in a pattern, where the HDRs have various sizes and/or shapes. In some cases, at least two HDRs have different sizes and/or shapes from each other. In some cases, a first set of HDRs having sizes and/or shapes different from the sizes and/or shapes of a second set of HDRs. In some cases, a first set of HDRs are formed of a material with a first relative permittivity different from a second relative permittivity of the material used for a second set of HDRs. The pattern of the sets of HDRs of respective sizes, shapes, and/or materials can use any one of the patterns described herein, for example, the patterns illustrated in FIGS. 3A-3C. In the example illustrated in FIG. 3D, the four adjacent HDRs in two adjacent rows form a rectangular shape 315D. FIG. 3E illustrates an example of a waveguide 300D having a plurality of HDRs 310D disposed in a controlled manner such that the distance of adjacent HDRs is less than the wavelength of the EM wave to propagate. In some cases, the HDRs 310D have generally same sizes, shapes, and/or materials. In some other cases, the HDRs 310D can have different sizes, shapes, and/or materials. In such cases, the HDRs are disposed in a manner that the distance of adjacent HDRs within a same set is less than the wavelength of the EM wave to propagate. In some cases as illustrated in FIGS. 3D and 3E, different sizes and/or shapes of HDRs can propagate EM waves in different wavelength ranges. For example, using a material with a relative permittivity of 40, small HDRs of 0.68 mm diameter propagate EM waves in the 60 GHz range; medium HDRs of 7 mm diameter propagate EM waves in the 5.8 GHz range; and large HDRs of 17 mm diameter propagate EM waves in the 2.4 GHz range.

In some embodiments, the HDRs in a waveguide can include distinct sets of HDRs made of different dielectric materials such that each set of HDRs has a distinct relative permittivity and is capable of propagating EM waves of a particular wavelength range. In some cases, the waveguide include a first set of HDRs having a first relative permittivity and a second set of HDRs having a second relative permittivity different from the first relative permittivity. In some configurations, the first set of HDRs are disposed in a first pattern and the second set of HDRs are disposed in a second pattern, where the second pattern can be the same as the first pattern or different from the first pattern. In some configurations as illustrated in FIG. 3D, each set of HDRs are disposed in a regular pattern. In some configurations as illustrated in FIG. 3E, each set of HDRs are disposed in a controlled manner such that the distance of adjacent HDRs is less than the wavelength of the EM wave to propagate.

FIG. 3F illustrates an example of waveguide 300F having a row of HDRs 310E Adjacent HDRs 310F can have generally same distance, as illustrated. In some other cases, distances between adjacent HDRs 310F are within the range of S*(1±40%), where S is the desired distance between adjacent HDRs 310F. In some cases, HDRs 310F are disposed in a control way such that the distance of adjacent HDRs is less than the wavelength of the EM wave to propagate. In some implementations, the waveguide 300F can include an attachment device, for example, an adhesive strip, adhesive segments, hook or loop fastener(s), or the like.

FIG. 3G illustrates an example of a waveguide 300G in stacks. The waveguide 300G has three sections, 301G, 302G, and 303G. Each section (301G, 302G, or 303G) includes a plurality of HDRs 310G. Each section (301G, 302G, or 303G) can have the HDRs 310G disposed in any patterns illustrated in FIGS. 3A-3F. In the example illustrated, the HDRs 310G are disposed in a row for each section. Two adjacent sections have an overlapping section 315D, which includes at least two HDRs to allow EM wave propagation across the sections.

FIGS. 4A-4C are block diagrams illustrating various shapes that can be used for the structure of an HDR, according to one or more techniques of this disclosure. FIG. 4A illustrates an example of a spherical HDR, according to one or more techniques of the current disclosure. Spherical HDR 80 can be made of a variety of ceramic materials, for example, including BaZnTa oxide, BaZnCoNb oxide, Zr-based ceramics, Titanium-based ceramics, Barium Titanate-based materials, Titanium oxide-based materials, Y5V, and X7R compositions, or the like. HDRs 82 and 84 of FIGS. 6B and 6C can be made of similar materials. Spherical HDR 80 is symmetrical, so the incident angles of the antenna and the emitted waves do not affect the system as a whole. The relative permittivity of HDR sphere 80 is directly related to the resonance frequency. For example, at the same resonance frequency, the size of HDR sphere 80 can be reduced by using higher relative permittivity material. The TM resonance frequency for HDR sphere 80 can be calculated using the following formula, for mode S and pole n:

$$f_{n,s}^{TM} \sim \frac{C}{2a\sqrt{\varepsilon_r}}\left(\frac{n-1}{2}+S\right)$$

The TE resonance frequency for HDR sphere 80 can be calculated using the following formula, for mode S and pole n:

$$n_{n,s}^{TE} \sim \frac{C}{2a\sqrt{\varepsilon_r}}\left(\frac{n}{s}+S\right)$$

where a is the radius of the cylindrical resonator.

FIG. 4B is a block diagram illustrating an example of a cylindrical HDR, according to one or more techniques of the current disclosure. Cylindrical HDR 82 is not symmetric about all axes. As such, the incident angle of the antenna and the emitted waves relative to cylindrical HDR 82 may have an effect of polarization on the waves as they pass through cylindrical HDR 82, depending on the incident angle, as opposed to the symmetrical spherical HDR 80 of FIG. 4A. The approximate resonant frequency of $TE_{01n}$ mode for an isolated cylindrical HDR 82 can be calculated using the following formula:

$$f_{GHz} = \frac{34}{a\sqrt{\varepsilon_r}}\left(\frac{a}{L}+3.45\right)$$

where a is the radius of the cylindrical resonator and L is its length. Both a and L are in millimeters. Resonant frequency $f_{GHz}$ is in gigahertz. This formula is accurate to about 2% in the range: $0.5 < a/L < 2$ and $30 < \varepsilon_r < 50$.

FIG. 4C is a block diagram illustrating an example of a cubic HDR, according to one or more techniques of the current disclosure. Cubic HDR 84 is not symmetric about all axes. As such, the incident angle of the antenna and the emitted waves relative to cylindrical HDR 82 may have an effect of polarization on the waves as they pass through cubic HDR 84, as opposed to the symmetrical spherical HDR 80 of FIG. 4A. Approximately, the lowest resonance frequency for cubic HDR 84 is:

$$f = \frac{c}{\sqrt{2}\sqrt{\varepsilon_r}} \cdot \frac{1}{a}$$

where a is the cube side length and c is the light velocity in air.

FIG. 4D is a block diagram illustrating an example of a spherical HDR 88 coated with a base material 90. This can be used to control the spacing between HDRs. In some cases, this can be used in manufacture procedure to control the regular lattice constant of an array of HDRs. For example, the spherical HDR 88 has a diameter of 17 mm with a coating thickness of the base material 90 as 4.25 mm.

Figure 5A:
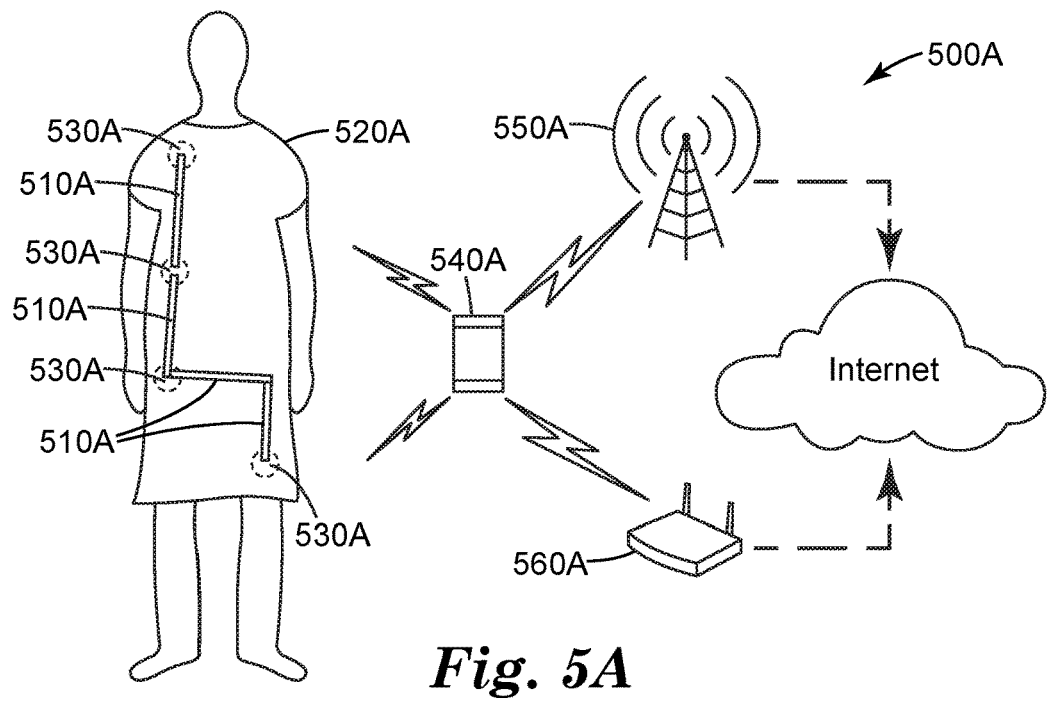
FIG. 5A illustrates an example of a body area network ("BAN") using a waveguide having HDRs.

FIG. 5A illustrates an example of a body area network ("BAN") 500A using a waveguide 510A having HDRs. The waveguide 510A can use any one of the configurations described herein. As illustrated in the example, the waveguide 510A is disposed on or integrated with a garment 520A. In some cases, the waveguide 510A can be in the form of a tape strip that can be attached the garment 520A. In some other cases, the waveguide 510A is an integrated part of the garment 520A. In some cases, the BAN 500A includes several miniaturized body sensor units ("BSUs") 530A. The BSUs 530A may include, for example, blood pressure sensor, insulin pump sensor, ECG sensor, EMG sensor, motion sensor, and the like. The BSUs 530A are electrically coupled to the waveguide 510A. "Electrically coupled" refers to electrically connected or wirelessly connected. In some cases, the BAN 500A can be used with sensors applied to a person's surrounding environment, for example, a helmet, a body armor, equipment in use, or the like.

In some cases, one or more components of the BSUs 530A is integrated with a transceiver (not illustrated) that is electromagnetically coupled to the waveguide 510A. In some cases, one or more components of the BSUs 530A is disposed on the garment 520A. In some cases, one or more components of the BSUs 530A is disposed on the body and electromagnetically coupled to a transceiver or the waveguide 510A. The BSUs 530A can wirelessly communicate with a control unit 540A through the waveguide 510A. The control unit 540A may further communicate via cellular network 550A or wireless network 560A.

Figure 5B:
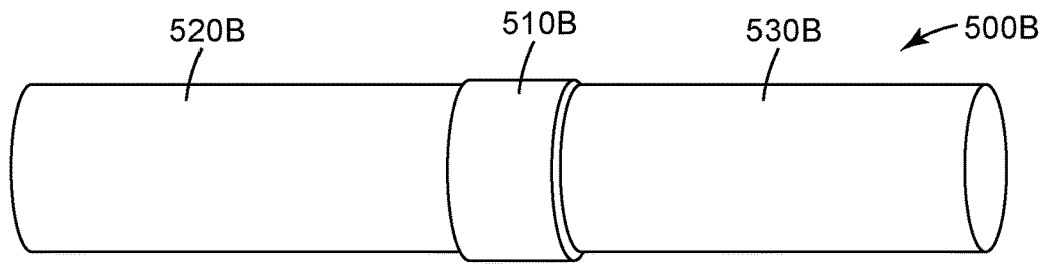
FIG. 5B illustrates an example of a waveguide used in a communication system.

FIG. 5B illustrates an example of a waveguide 510B used in a communication system 500B. The communication system 500B includes two communication components 520B and 530B that propagate an EM wave. For example, the components 520B and/or 530B include dielectric resonators. As another example, dielectric resonators are disposed on the surface of the components 520B and/or 530B. The communication system 500B further includes a waveguide 510B disposed between the two components 520B and 530B and capable of propagating the EM wave from one component to the other component. The waveguide 510B can use any one of the configurations described herein.

Figure 5C:
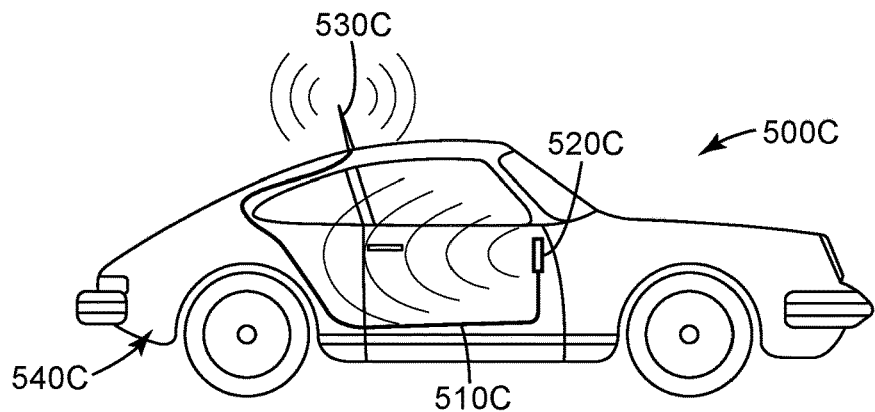
FIG. 5C illustrates an example of a communication system to be used for an enclosure.

FIG. 5C illustrates an example of a communication system 500C to be used for an enclosure 540C, for example, a vehicle. The communication system 500C includes a transceiver 520C located within the enclosure 540C, a transceiver 530C located external of the enclosure 540C or at a position allowing EM waves air propagation, and a waveguide 510C electromagnetically coupled with the transceivers 520C and 530C. In an example of an enclosure disrupting EM wave propagation, the communication system 500C allows two-way or one-way communication of signals carried in the EM wave in and out of the enclosure. The waveguide 510C can use any one of the configurations described herein.

Figure 6:
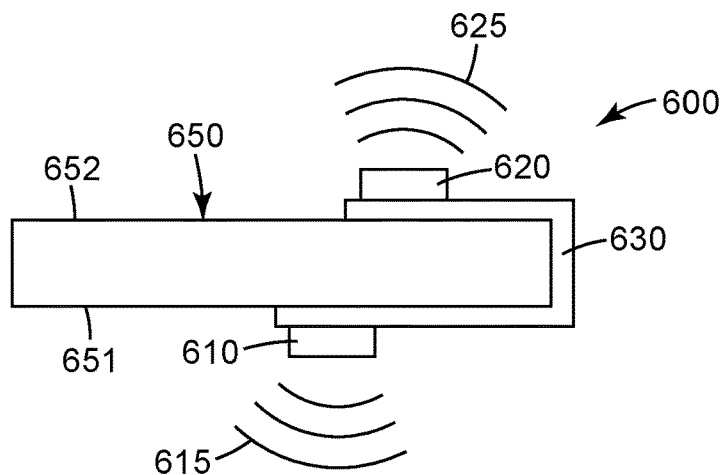
FIG. 6 illustrates a block diagram illustrating one embodiment of a communication device 600 to be used with a blocking structure.

FIG. 6 illustrates a block diagram illustrating one embodiment of a communication device 600 to be used with a blocking structure 650. A blocking structure refers to a structure that will cause significant loss or disruption of wireless signals within certain wavelength. The blocking structure can cause reflections and refraction of the transmitted wireless signals and result in a signal loss. For example, block structures can be, for example, concrete walls with metal, metalized glass, glass containing lead, metal walls, or the like. In some cases, the communication device 600 is a passive device that is capable of capturing wireless signals on one end (e.g., in front of a wall), guide the signals in a predefined way (e.g., around the wall) and re-transmit the wireless signals on the other end (e.g. rear-side of the wall). The communication device 600 includes a first passive coupling device 610, a second passive coupling device 620, and a waveguide 630. The waveguide 630 can use any waveguide configurations described herein.

The blocking structure 650 has a first side 651 and a second side 652. In some cases, the first side 651 is adjacent to the second side 652. In some cases, the first side 651 is opposite to the second side 652. In some cases, the first coupling device is disposed proximate to a first side of the blocking structure and configured to capture an incident electromagnetic wave 615, or referred to as a wireless signal. The second coupling device 620 is disposed proximate to a second side of the blocking structure. The waveguide 630 is electromagnetically coupled to the first and the second coupling devices (610, 620) and disposed around the blocking structure 650. In some cases, the waveguide 630 has a resonance frequency matched with the first and the second coupling devices (610, 620). The waveguide 630 is configured to propagate the electromagnetic wave 615 captured by the first coupling device 610 toward the second coupling device. The second coupling device 620 is configured to transmit an electromagnetic wave 625 corresponding to the incident electromagnetic wave 615. In some embodiments, electromagnetic waves can be propagated in a reverse direction, such that the second coupling device 620 can capture an incident electromagnetic wave, couple the electromagnetic wave into the waveguide 630, the waveguide 630 propagate the electromagnetic wave toward the first coupling device 610, and the first coupling device 610 can transmit the electromagnetic wave.

In some embodiments, at least one of the two coupling devices (610, 620) is a passive EM collector that is designed to capture EM waves within a certain range of wavelength. A coupling device can be, for example, a dielectric lens, a patch antenna, a Yagi antenna, a metamaterial coupling element, or the like. In some cases, the coupling device has a gain of at least 1. In some cases, the coupling device has a gain in the range of 1.5 to 3. In some cases, the coupling device a gain of at least 1. In some cases if directivity is desired, for example, to only couple energy from a specific source, or block energy from other angles or sources like interferers, the coupling device may have a gain of at least 10 to 30.

Figure 7A:
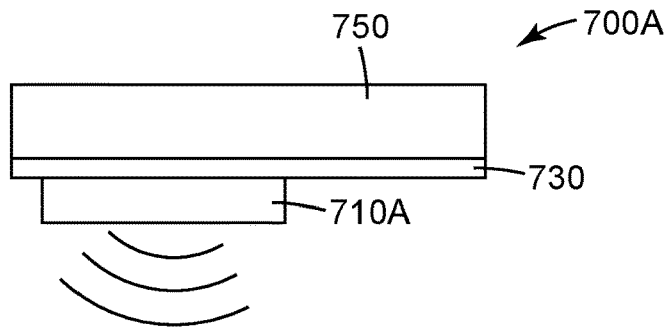
FIGS. 7A-7D illustrate some examples of coupling devices.
Figure 7B:
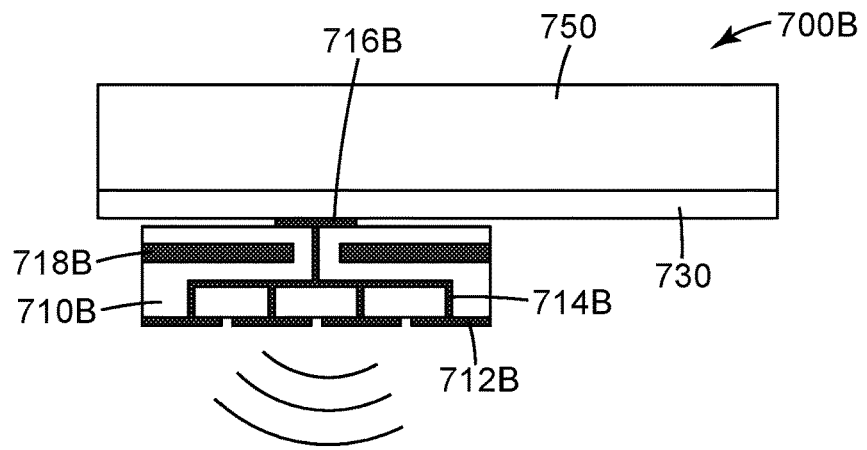

FIGS. 7A-7D illustrate some examples of coupling devices. In FIG. 7A, the coupling device 710A is a dielectric lens. The communication device 700A includes the coupling device 710A and a waveguide 730 electromagnetically coupled to the coupling device 710A. The coupling device 710A is disposed proximate to one side of a blocking structure 750. The dielectric lens 710A can collect electromagnetic waves from the surrounding environment and couple the electromagnetic waves to the waveguide 730. In FIG. 7B, the coupling device 710B is a patch antenna. The communication device 700B includes the coupling device 710B and the waveguide 730 electromagnetically coupled to the coupling device 710B. The coupling device 710B is disposed proximate to one side of a blocking structure 750. In the example illustrated, the patch antenna 710B includes patch antenna array 712B that can collect electromagnetic waves from the surrounding environment, feeding network 714B to transmit the electromagnetic waves, secondary patch 716B couple the electromagnetic waves to the waveguide 730, and a ground 718B.

Figure 7C:
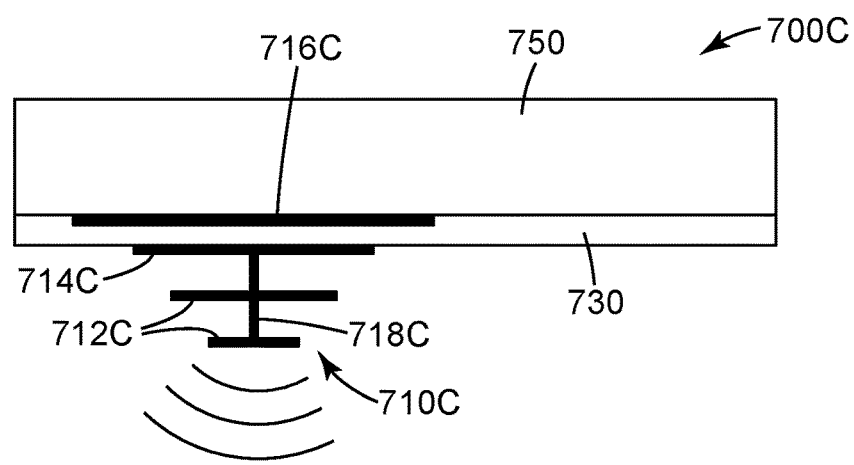

In FIG. 7C, the coupling device 710C is a Yagi antenna. The communication device 700C includes the coupling device 710C and the waveguide 730 electromagnetically coupled to the coupling device 710C. The coupling device 710C is disposed proximate to one side of a blocking structure 750. In the example illustrated, the Yagi antenna 710C includes directors 712C that can collect electromagnetic waves from the surrounding environment, a ground plane/reflector 716C, a support 718C, and patch 714C couple the electromagnetic waves to the waveguide 730. The support 718C can be formed of non-conductive materials.

Figure 7D:
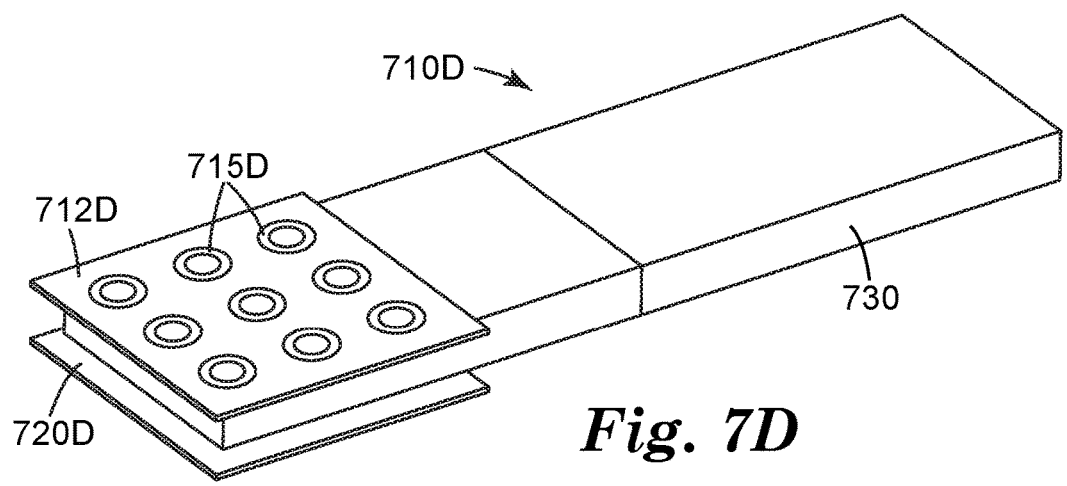

FIG. 7D illustrates one example of a coupling device 710D. The coupling device 710D is a metamaterial coupling element including a top layer 712D and a ground element 720D. The top layer 712D is disposed on one side of the waveguide 730 and the ground element 720D is disposed on the opposite side of the waveguide 730. In some embodiments, the top layer 712D can be formed of solid metal. The top layer 712D includes a plurality of ring elements 715D disposed thereon. In some embodiments, ring elements 715D can be disposed on any dielectric substrate, or directly on a surface of the waveguide 730. Ring elements 715D can be made of conductive materials, for example, such as copper, silver, gold, or the like. In some cases, ring elements can be printed on the top layer 712D. In some cases, the ground element 720D can be a sold metal ground plane. In some cases, the ground element 720D may have a same pattern of ring elements 715D (not shown) as the top layer 712D. In some cases, the top layer 712D may include a conductive layer with the conductive layer being etched at the ring elements 715D.

EXEMPLARY EMBODIMENTS

Item A1. A device, comprising:
two transceivers,
a waveguide for propagating an electromagnetic wave and electromagnetically coupled to the two transceivers, the waveguide comprising a base material and a plurality of resonators disposed in a pattern, the plurality of resonators having a resonance frequency, wherein each of the plurality of resonators has a relative permittivity greater than a relative permittivity of the base material, wherein at least two of the plurality of resonators are spaced according to a lattice constant that defines a distance between a center of a first one of the resonators and a center of a neighboring second one of the resonators.

Item A2. The device of Item A1, further comprising:
a substrate, wherein the waveguide is disposed on or integrated with the substrate.

Item A3. The device of Item A2, wherein the two transceivers are disposed on the substrate.

Item A4. The device of any one of Item A1-A3, wherein the waveguide is flexible.

Item A5. The device of any one of Item A1-A4, wherein the plurality of resonators are disposed in or on the base material.

Item A6. The device of any one of Item A1-A5, wherein the base material is coated on at least some of the plurality of resonators.

Item A7. The device of any one of Item A1-A6, wherein at least one of the two transceivers is a transmitter.

Item A8. The device of any one of Item A1-A7, further comprising:
a first sensor electrically coupled to a first transceiver of the two transceivers and configured to generate a first sensing signal.

Item A9. The device of Item A8, wherein the first transceiver is configured to transmit the first sensing signal to the second transceiver via the waveguide.

Item A10. The device of Item A8, further comprising:
a second sensor electrically coupled to a second transceiver of the two transceivers.

Item A11. The device of any one of Item A1-A10, wherein the lattice constant is less than the wavelength of the electromagnetic wave.

Item A12. The device of any one of Item A1-A11, wherein the resonance frequency of the plurality of resonators is selected at least in part based on a frequency of the electromagnetic wave.

Item A13. The device of any one of Item A1-A12, wherein the resonance frequency of the plurality of resonators is selected to match a frequency of the electromagnetic wave.

Item A14. The device of any one of Item A1-A13, wherein a ratio of the diameter of the resonators to the lattice constant is less than one.

Item A15. The device of any one of Item A1-A14, wherein each of the plurality of resonators has a relative permittivity that is at least five times of a relative permittivity of the base material.

Item A16 The device of any one of Item A1-A15, wherein each of the plurality of resonators has a relative permittivity that is at least ten times of a relative permittivity of the base material.

Item A17. The device of any one of Item A1-A16, wherein the resonance frequency of the plurality of resonators is within a millimeter wave range.

Item A18. The device of any one of Item A1-A17, wherein the resonance frequency of the plurality of resonators is approximate to 60 GHz.

Item A19. The device of any one of Item A1-A18, wherein the resonance frequency of the plurality of resonators is within infrared frequency range.

Item A20. The device of any one of Item A1-A19, wherein the plurality of resonators are made of a ceramic material.

Item A21. The device of any one of Item A1-A20, wherein each of the plurality of resonators has a relative permittivity greater than 10.

Item A22. The device of any one of Item A1-A21, wherein each of the plurality of resonators has a relative permittivity greater than 20.

Item A23. The device of any one of Item A1-A22, wherein each of the plurality of resonators has a relative permittivity greater than 50.

Item A24. The device of any one of Item A1-A23, wherein each of the plurality of resonators has a relative permittivity greater than 100.

Item A25. The device of any one of Item A1-A24, wherein each of the plurality of resonators has a relative permittivity within the range of 200 to 20,000.

Item A26. The device of any one of Item A1-A25, wherein the plurality of resonators are made of one doped or undoped Barium Titanate ($BaTiO_3$), Barium Strontium Titanate ($BaSrTiO_3$), Y5V, and X7R compositions, $TiO_2$ (Titanium dioxide), Calcium Copper Titanate ($CaCu_3Ti_4O_{12}$), Lead Zirconium Titanate ($PbZr_xTi_{1-x}O_3$), Lead Titanate ($PbTiO_3$), Lead Magnesium Titanate ($PbMgTiO_3$), Lead Magnesium Niobate-Lead Titanate ($Pb(Mg_{1/3}Nb_{2/3})O_3$.—$PbTiO_3$), Iron Titanium Tantalate ($FeTiTaO_6$), NiO co-doped with Li and Ti($La_{1.5}Sr_{0.5}NiO_4$, $Nd_{1.5}Sr_{0.5}NiO_4$), and combinations thereof.

Item A27. The device of any one of Item A1-A26, wherein at least one of the plurality of resonators are heat treated.

Item A28. The device of any one of Item A1-A27, wherein at least one of the plurality of resonators are sintered.

Item A29. The device of Item A28, wherein at least one of the plurality of resonators are sintered at a temperature higher than 600° C. for a period of two to four hours.

Item A30. The device of Item A28, wherein at least one of the plurality of resonators are sintered at a temperature higher than 900° C. for a period of two to four hours.

Item A31. The device of Item A4, wherein the base material comprises at least one of Teflon®, quartz glass, cordierite, borosilicate glass, perfluoroalkoxy, polyurethane, polyethylene, and fluorinated ethylene propylene.

Item A32. The device of any one of Item A1-A31, wherein the base material has a relative permittivity in the range of 1 to 20.

Item A33. The device of any one of Item A1-A32, wherein the base material has a relative permittivity in the range of 1 to 10.

Item A34. The device of any one of Item A1-A33, wherein the base material has a relative permittivity is in the range of 1 to 7.

Item A35. The device of any one of Item A1-A34, wherein the base material has a relative permittivity is in the range of 1 to 5.

Item A36. The device of any one of Item A1-A35, wherein the plurality of resonators are formed having one of a spherical shape, a cylindrical shape, a cubic shape, a rectangular shape, or an elliptical shape.

Item A37. A wearable device comprising: the device of Item A1.

Item A38. The wearable device of Item A37, further comprising: one or more sensors, each sensor associated with a respective one of the two transceivers.

Item A39. The wearable device of Item A38, wherein a transceiver is associated with two or more sensors.

Item A40. The wearable device of any one of Item A37-A39, wherein the wearable device is a garment.

Item A41. A wireless communication system comprising:
first and second transceivers; and a regular array of resonators forming a waveguide extending between and coupled to the first and second transceivers.

Item A42. The wireless communication system of Item A41, wherein the waveguide comprises a non-linear portion.

Item A43. A waveguide for propagating an electromagnetic wave, comprising:
a plurality of resonators having a resonance frequency, wherein each of the plurality of resonators is coated with a base material,
wherein each of the plurality of resonators has a relative permittivity greater than a relative permittivity of the base material.

Item A44. The waveguide of Item A43, wherein each of the plurality of resonators has a relative permittivity that is at least five times of a relative permittivity of the base material.

Item A45. The waveguide of Item A43 or A44, wherein each of the plurality of resonators has a relative permittivity that is at least ten times of a relative permittivity of the base material.

Item A46. The waveguide of any one of Item A43-A45, wherein the resonance frequency of the plurality of resonators is selected to match a frequency of an electromagnetic wave.

Item A47. The waveguide of any one of Item A43-A46, wherein the plurality of resonators are formed having one of a spherical shape, a cylindrical shape, a cubic shape, a rectangular shape, or an elliptical shape.

Item A48. A waveguide for propagating an electromagnetic wave, comprising:
a base material,
a first set of dielectric resonators, each of the first set of dielectric resonators having generally a first size, and
a second set of dielectric resonators, each of the second set of dielectric resonators having generally a second size greater than the first size,
wherein each of the first set and the second set of dielectric resonators has a relative permittivity greater than a relative permittivity of the base material.

Item B1. A communication device for propagating an electromagnetic wave around a blocking structure, comprising:
a passive coupling device disposed proximate to a first side of the blocking structure and configured to capture the electromagnetic wave,
a transmitter disposed proximate to a second side of the blocking structure,
a waveguide electromagnetically coupled to the coupling device and the transmitter and disposed around the blocking structure, the waveguide having a resonance frequency matched with the coupling device, the waveguide configured to propagate the electromagnetic wave captured by the coupling device,
wherein the transmitter is configured to reradiate the electromagnetic wave.

Item B2. The device of Item B1, wherein the coupling device comprises a dielectric lens.

Item B3. The device of Item B1 or B2, wherein the coupling device comprises a patch antenna.

Item B4. The device of any one of Item B1-B3, wherein the coupling device comprises a metamaterial coupling element.

Item B5. The device of any one of Item B1-B4, wherein the waveguide comprises a base material and a plurality of resonators.

Item B6. The device of Item B5, wherein the plurality of resonators are disposed in a pattern.

Item B7. The device of Item B5, wherein the plurality of resonators are disposed in an array.

Item B8. The device of Item B5, wherein at least two of the plurality of resonators are spaced according to a lattice constant that defines a distance between a center of a first one of the resonators and a center of a neighboring second one of the resonators.

Item B9. The device of Item B7, wherein the lattice constant is less than the wavelength of the electromagnetic wave.

Item B10. The device of any one of Item B1-B9, wherein the resonance frequency of the coupling device is selected to match the frequency of the electromagnetic wave.

Item B11. The device of Item B7, wherein a ratio of the diameter of the resonators to the lattice constant is less than one.

Item B12. The device of Item B5, wherein the plurality of resonators are disposed in or on the base material.

Item B13. The device of Item B5, wherein the base material is coated on at least some of the plurality of resonators.

Item B14. The device of Item B5, wherein the resonance frequency of the plurality of resonators is selected at least in part based on a frequency of the electromagnetic wave.

Item B15. The device of Item B5, wherein the resonance frequency of the plurality of resonators is selected to match a frequency of the electromagnetic wave.

Item B16. The device of Item B5, wherein a ratio of the diameter of the resonators to the lattice constant is less than one.

Item B17. The device of Item B5, wherein each of the plurality of resonators has a relative permittivity that is at least five times of a relative permittivity of the base material.

Item B18. The device of Item B5, wherein each of the plurality of resonators has a relative permittivity that is at least ten times of a relative permittivity of the base material.

Item B19. The device of any one of Item B1-B18, wherein the resonance frequency of the waveguide is within a millimeter wave band.

Item B20. The device of any one of Item B1-B19, wherein the resonance frequency of the waveguide is approximate to 4.8 GHz.

Item B21. The device of any one of Item B1-B20, wherein the resonance frequency of the waveguide is within infrared frequency range.

Item B22. The device of Item B5, wherein the plurality of resonators are made of a ceramic material.

Item B23. The device of Item B5, wherein each of the plurality of resonators has a relative permittivity greater than 20.

Item B24. The device of Item B5, wherein each of the plurality of resonators has a relative permittivity greater than 100.

Item B25. The device of Item B5, wherein each of the plurality of resonators has a relative permittivity within the range of 200 to 20,000.

Item B26. The device of Item B5, wherein the plurality of resonators are made of one doped or undoped Barium Titanate ($BaTiO_3$), Barium Strontium Titanate ($BaSrTiO_3$), Y5V, and X7R compositions, $TiO_2$ (Titanium dioxide), Calcium Copper Titanate ($CaCu_3Ti_4O_{12}$), Lead Zirconium Titanate ($PbZr_xTi_{1-x}O_3$), Lead Titanate ($PbTiO_3$), Lead Magnesium Titanate ($PbMgTiO_3$), Lead Magnesium Niobate-Lead Titanate ($Pb(Mg_{1/3}Nb_{2/3})O_3$.—$PbTiO_3$), Iron Titanium Tantalate (FeTiTaO$_6$), NiO co-doped with Li and Ti(La$_{1.5}$Sr$_{0.5}$NiO$_4$, Nd$_{1.5}$Sr$_{0.5}$NiO$_4$), and combinations thereof.

Item B27. The device of Item B5, wherein at least one of the plurality of resonators are heat treated.

Item B28. The device of Item B5, wherein at least one of the plurality of resonators are sintered.

Item B29. The device of Item B28, wherein at least one of the plurality of resonators are sintered at a temperature higher than 600° C. for a period of two to four hours.

Item B30. The device of Item B28, wherein at least one of the plurality of resonators are sintered at a temperature higher than 900° C. for a period of two to four hours.

Item B31. The device of Item B5, wherein the base material comprises at least one of Teflon®, quartz glass, cordierite, borosilicate glass, perfluoroalkoxy, polyurethane, polyethylene, and fluorinated ethylene propylene.

Item B32. The device of any one of Item B1-B31, wherein the second side is opposite to the first side of the blocking structure.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A communication device for propagating an electromagnetic wave around a blocking structure, comprising:
    a passive coupling device disposed proximate to a first side of the blocking structure and configured to capture the electromagnetic wave,
    a transmitter disposed proximate to a second side of the blocking structure, and
    a waveguide electromagnetically coupled to the coupling device and the transmitter and disposed around the blocking structure, the waveguide having a resonance frequency matched with the coupling device, the waveguide configured to propagate the electromagnetic wave captured by the coupling device,
    wherein the transmitter is configured to reradiate the electromagnetic wave,
    wherein the waveguide comprises a base material and a plurality of resonators,
    wherein at least two of the plurality of resonators are spaced according to a lattice constant that defines a distance between a center of a first one of the resonators and a center of a neighboring second one of the resonators,
    wherein a ratio of the diameter of the resonators to the lattice constant is less than one.

2. The device of claim 1, wherein the coupling device comprises a dielectric lens.

3. The device of claim 1, wherein the coupling device comprises a patch antenna.

4. The device of claim 1, wherein the coupling device comprises a metamaterial coupling element.

5. The device of claim 1, wherein the plurality of resonators are disposed in a pattern.

6. The device of claim 1, wherein the plurality of resonators are disposed in an array.

7. The device of claim 1, wherein the lattice constant is less than the wavelength of the electromagnetic wave.

8. The device of claim 1, wherein the resonance frequency of the coupling device is selected to match the frequency of the electromagnetic wave.

9. The device of claim 1, wherein the resonance frequency of the plurality of resonators is selected at least in part based on a frequency of the electromagnetic wave.

10. The device of claim 1, wherein the resonance frequency of the waveguide is approximate to 4.8 GHz.

11. The device of claim 1, wherein the plurality of resonators are made of one doped or undoped Barium Titanate (BaTiO$_3$), Barium Strontium Titanate (BaSrTiO$_3$), Y5V, and X7R compositions, TiO$_2$ (Titanium dioxide), Calcium Copper Titanate (CaCu$_3$Ti$_4$O$_{12}$), Lead Zirconium Titanate (PbZr$_x$Ti$_{1-x}$O$_3$), Lead Titanate (PbTiO$_3$), Lead Magnesium Titanate (PbMgTiO$_3$), Lead Magnesium Niobate-Lead Titanate (Pb(Mg$_{1/3}$Nb$_{2/3}$)O$_3$-PbTiO$_3$), Iron Titanium Tantalate (FeTiTaO$_6$), NiO co-doped with Li and Ti (La$_{1.5}$Sr$_{0.5}$NiO$_4$, Nd$_{1.5}$Sr$_{0.5}$ NiO$_4$), and combinations thereof.

12. The device of claim 1, wherein the second side is opposite to the first side of the blocking structure.

* * * * *